United States Patent [19]
Nakamura

[11] Patent Number: 6,128,445
[45] Date of Patent: Oct. 3, 2000

[54] DISTANCE DETECTOR

[75] Inventor: Kenji Nakamura, Sakai, Japan

[73] Assignee: Minolta Co., Ltd., Osaka, Japan

[21] Appl. No.: 09/195,670

[22] Filed: Nov. 19, 1998

[30] Foreign Application Priority Data

Nov. 20, 1997 [JP] Japan .................................. 9-319233

[51] Int. Cl.[7] .............................. G03B 13/36; G01C 3/08
[52] U.S. Cl. ........................................... 396/121; 356/3.14
[58] Field of Search ................................. 396/121, 122, 396/123, 51; 356/3.14, 3.13, 3; 250/201.8, 201.2, 201.6

[56] References Cited

U.S. PATENT DOCUMENTS

| | | | |
|---|---|---|---|
| 4,910,548 | 3/1990 | Taniguchi et al. ................. | 396/123 |
| 5,597,999 | 1/1997 | Kinba et al. ....................... | 250/201.7 |
| 5,692,222 | 11/1997 | Yamada et al. .................... | 396/51 |
| 5,731,864 | 3/1998 | Hamada et al. .................... | 396/121 |

*Primary Examiner*—W. B. Perkey
*Attorney, Agent, or Firm*—Burns, Doane, Swecker & Mathis, LLP

[57] ABSTRACT

A distance detector has an optical system, a distance sensor, and a distance calculating circuit. The optical system forms an image of a subject. The distance sensor has at least three line sensors that are disposed substantially on the imaging plane of the optical system and are arranged at partially uneven intervals. The distance calculating circuit calculates the distance to the subject in accordance with the output from the distance sensor.

18 Claims, 17 Drawing Sheets

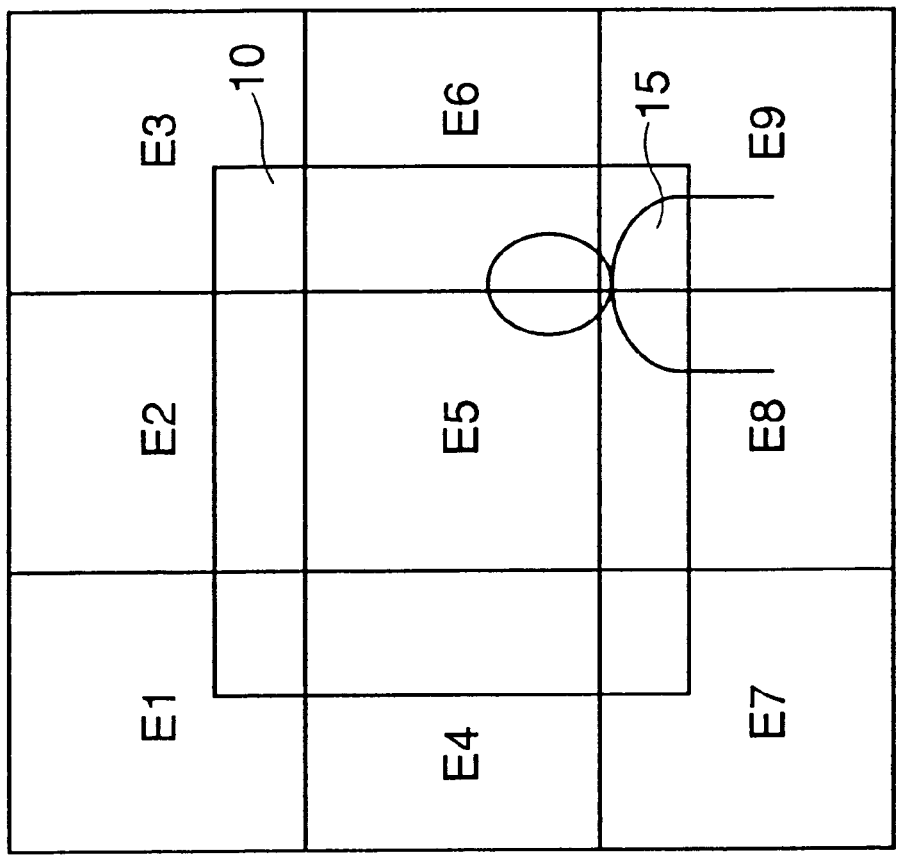
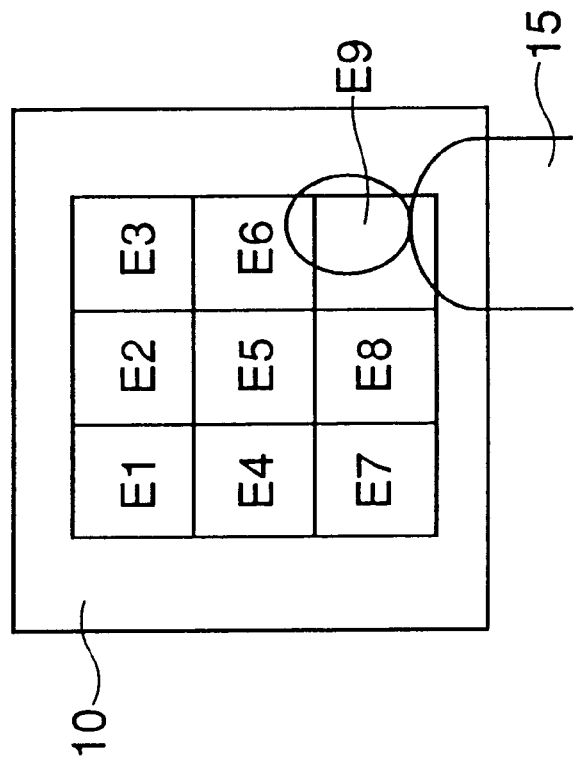

DISTANCE DETECTOR

This application is based on application No. H09-319233 filed in Japan, the content of which is hereby incorporated by reference.

BACKGROUND OF THE INVENTION

1. Field of the Invention

The present invention relates to a distance detector used for automatic focusing or other purposes in a silver halide film camera, video camera, SVC (still video camera), or the like.

2. Description of the Prior Art

A conventional example of such a distance detector performs distance measurement within a distance measurement area secured along a horizontal line on an image screen of a camera or the like. The relationship between the image screen and the distance measurement area of this distance detector is shown in FIG. 17. In this distance detector, the distance measurement area L1 covers only a portion along a horizontal center line of the image screen 10, and therefore it is impossible to perform distance measurement with a subject 15 located in an upper and lower portion of the image screen 10.

To achieve distance measurement without fail, some distance detectors employ a distance sensor composed of a plurality of pairs of line sensors, and others even employ an area sensor. In a distance detector of the former type, for example as shown in FIG. 18, distance measurement is performed in distance measurement areas L1 to L5 secured along a plurality of lines, and thus in a wider area in total. Here, the greater the number of distance measurement areas L1 to L5 covered by the individual line sensors, the more likely the subject distance is detected successfully. In addition, measuring the subject distance by the use of a plurality of line sensors leads to higher distance measurement accuracy.

This type of distance detector employs a distance sensor having, for example as shown in FIG. 19, five pairs of line sensors 90 to 94. Each of these pairs of line sensors 90 to 94 has light-sensor arrays 22, which generate photoelectric charges in accordance with the amount of light they receive, and processor arrays 21, which feed out those photoelectric charges successively pixel by pixel. The distance sensor also has, along its vertical center line, a control circuit 20, which generates a clock in synchronism with which the above photoelectric charges are fed out. Conventionally, as shown in FIG. 19, the five pairs of line sensors 90 to 94 are arranged with their light-sensor and processor arrays oriented identically and with the light-sensor arrays spaced evenly.

However, this distance sensor, precisely because it has an increased number of distance measurement areas, requires an accordingly large-scale circuit to control the line sensors, and thus suffers from its comparatively large size. Moreover, the resulting increase in the amount of data to be processed requires that a microcomputer or the like take an unduly long time to calculate the subject distance. This causes a time lag in distance measurement, and thus, in a camera or the like, causes an undesirable delay in automatic focusing, such as may make the operation of the camera uncomfortable.

In particular, in a camera provided with a variable-magnification optical system that can vary the shooting magnification, even if the distance measurement areas L1 to L5 are, as shown in FIG. 20A, so arranged as to evenly cover the entire image screen 10 at a low shooting magnification, as the shooting magnification is increased, the angle of view becomes narrower as shown in FIG. 20B, and thus the distance measurement areas L1 to L5 become more and more widely spaced, until eventually, in some cases, the measurement areas other than the central one L3 go out of the image screen 10. This cannot be said to be an effective increase in the number of distance measurement areas, but rather makes subject-distance measurement less secure.

On the other hand, in a distance detector of the latter type that employs an area sensor, as shown in FIG. 21A, the sensing area of the area sensor is divided into nine equally sized distance measurement areas E1 to E9, and detection of the subject 15 and measurement of the distance to the subject 15 are performed in each of these distance measurement areas E1 to E9.

However, also in this case, distance measurement is performed in accordance with the data obtained from the entire sensing area, and thus the resulting increase in the amount of data to be processed requires that the microcomputer take an unduly long time to calculate the subject distance. Moreover, in a camera provided with a variable-magnification optical system, as shown in FIG. 21B, as the shooting magnification is increased, the distance measurement areas other than the central one E5 go out of the image screen 10. This cannot be said to be an effective increase in the number of distance measurement areas.

SUMMARY OF THE INVENTION

An object of the present invention is to provide a distance detector that employs a distance sensor composed of a plurality of pairs of line sensors, or alternatively an area sensor, and that nevertheless calculates the subject distance in a satisfactorily short time and permits the subject distance to be measured without fail even at a high shooting magnification by securing a sufficiently high density of distance measurement areas.

To achieve the above object, according to one aspect of the present invention, a distance detector has an optical system, a distance sensor, and a distance calculating circuit. The optical system forms an image of a subject. The distance sensor has at least three line sensors that are disposed substantially on the imaging plane of the optical system and are arranged at partially uneven intervals. The distance calculating circuit calculates the distance to the subject in accordance with the output from the distance sensor.

To achieve the above object, according to another aspect of the present invention, a distance detector has an optical system, a distance sensor, an extracting circuit, and a distance calculating circuit. The optical system forms an image of a subject. The distance sensor is disposed substantially on the imaging plane of the optical system and has an area sensor composed of a plurality of pixels arranged in a two-dimensional array. The extracting circuit extracts data related to the subject image from a plurality of sensing areas provided on the area sensor. The sensing areas are distributed unevenly over the area sensor. The distance calculating circuit calculates the distance to the subject in accordance with the extracted data related to the subject image.

To achieve the above object, according to another aspect of the present invention, a photoelectric converter has a sensor and a control circuit. The sensor has at least three line sensors arranged at partially uneven intervals. The control circuit controls and drives the line sensors.

To achieve the above object, according to still another aspect of the present invention, a photoelectric converter has an area sensor, a control circuit, and an extracting circuit.

The area sensor has a plurality of pixels arranged in a two-dimensional array. The control circuit controls reading operation of the area sensor. The extracting circuit extracts, out of the data read out by the area sensor, the data from a plurality of sensing areas that are distributed unevenly over the area sensor.

To achieve the above object, according to still another aspect of the present invention, an automatic focusing device has a sensor and an automatic focusing circuit. The sensor has at least three line sensors arranged at partially uneven intervals. The automatic focusing circuit performs focusing of a taking lens in accordance with the outputs from the line sensors.

To achieve the above object, according to still another aspect of the present invention, an automatic focusing device has an area sensor, an extracting circuit, and an automatic focusing circuit. The area sensor has a plurality of pixels arranged in a two-dimensional array. The extracting circuit extracts data related to the subject image from a plurality of sensing areas provided on the area sensor. The sensing areas are distributed unevenly over the area sensor. The automatic focusing circuit performs focusing of a taking lens in accordance with the extracted data related to the subject image.

BRIEF DESCRIPTION OF THE DRAWINGS

This and other objects and features of this invention will become clear from the following description, taken in conjunction with the preferred embodiments with reference to the accompanied drawings in which:

FIGS. 21A and 21B are diagrams showing the relationship between the image screen and the distance measurement areas of the image taking apparatus of another conventional camera provided with a variable-magnification optical system.

DESCRIPTION OF THE PREFERRED EMBODIMENTS

First Embodiment

Figure 1:
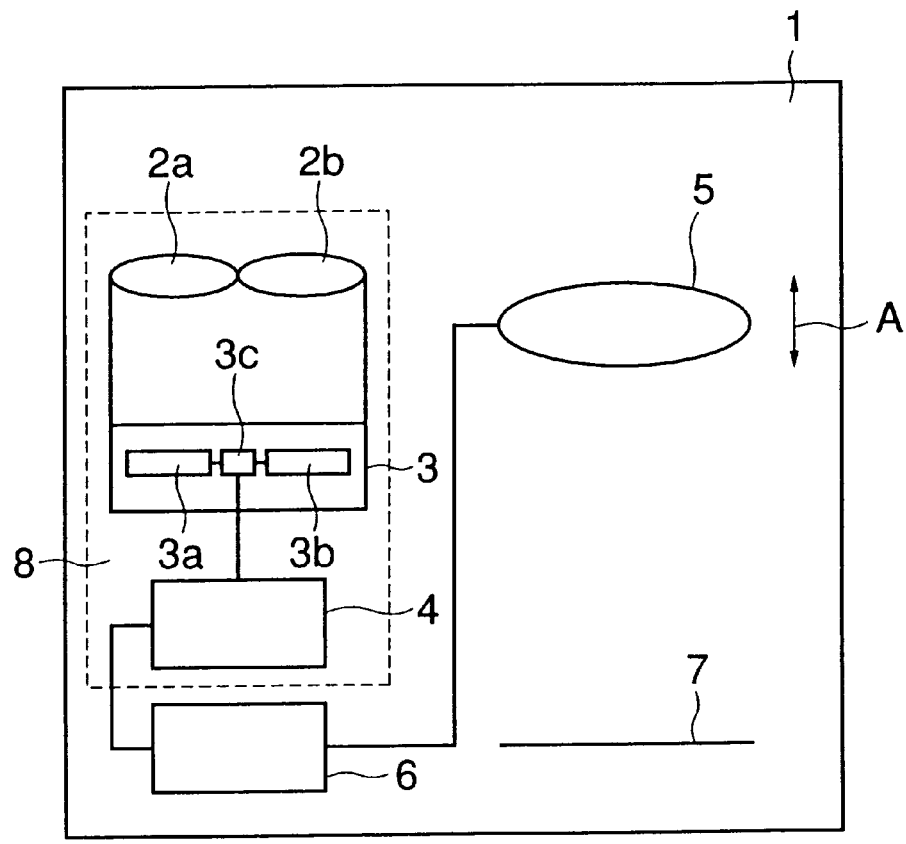
FIG. 1 is a block diagram of an image taking apparatus of a first embodiment of the present invention.

Hereinafter, embodiments of the present invention will be described. FIG. 1 is a block diagram of an image taking apparatus 1, such as a silver halide film camera, provided with a distance detector 8 according to this embodiment. The image taking apparatus 1 forms an image of a subject on an image forming means 7, such as a silver halide film, by means of an image taking optical system 5. The distance detector 8 detects the distance to the subject. A microcomputer 4 incorporated in the distance detector 8 performs automatic focusing by moving the image taking optical system 5 as indicated by arrow A by the use of a driving means 6 composed of a motor and other components in accordance with the detected subject distance.

The distance detector 8 is provided with, a pair of distance measurement optical systems 2a and 2b arranged parallel to each other, a distance sensor 3 which employs a plurality of pairs of line sensors disposed substantially over the entire imaging plane of the optical systems 2a and 2b, and a microcomputer 4 which serves as a means for performing calculation to obtain the distance to the subject in accordance with the signals transmitted from the distance sensor 3. Although, in this diagram, the distance sensor 3 is shown as having only a control circuit 3c and a pair of line sensors 3a and 3b that receive the subject light through the optical systems 2a and 2b, the distance sensor 3 is actually provided with, as will be described later, a plurality of pairs of line sensors so that distance measurement can be performed along a plurality of lines.

Figure 2:
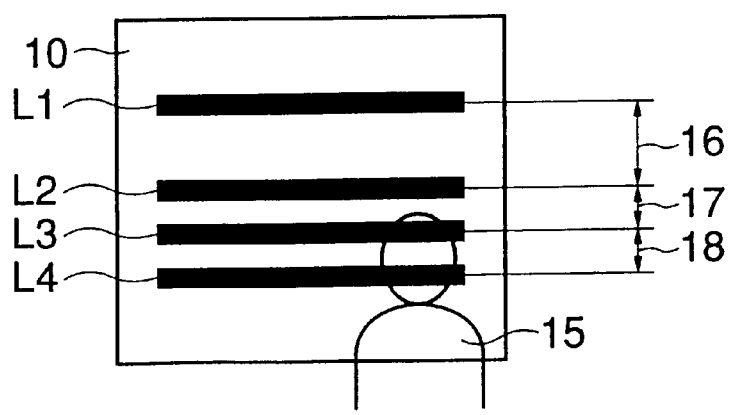
FIG. 2 is a diagram showing the relationship between the image screen and the distance measurement areas of the image taking apparatus of the first embodiment.

As shown in FIG. 2, the distance detector of the first embodiment has distance measurement areas L1 to L4 that are secured along four lines over the image screen 10. The interval 16 between the upper two distance measurement areas L1 and L2 is made longer than the intervals 17 and 18 between the lower three distance measurement areas L2 to L4. This is because the subject 15 is likely to be located in a lower portion of the image screen 10, and therefore the density of distance measurement areas may be lower in an upper portion of the image screen, which is not so important from the viewpoint of distance measurement, than in a lower portion thereof, which is more important in comparison.

Accordingly, as compared with the conventional distance detector which has the distance measurement areas arranged at equal intervals over the entire image plane, this distance detector can perform distance measurement more securely and with fewer distance measurement areas. This allows the microcomputer 4 (see FIG. 1) to calculate the subject distance in a shorter time.

Figure 3:
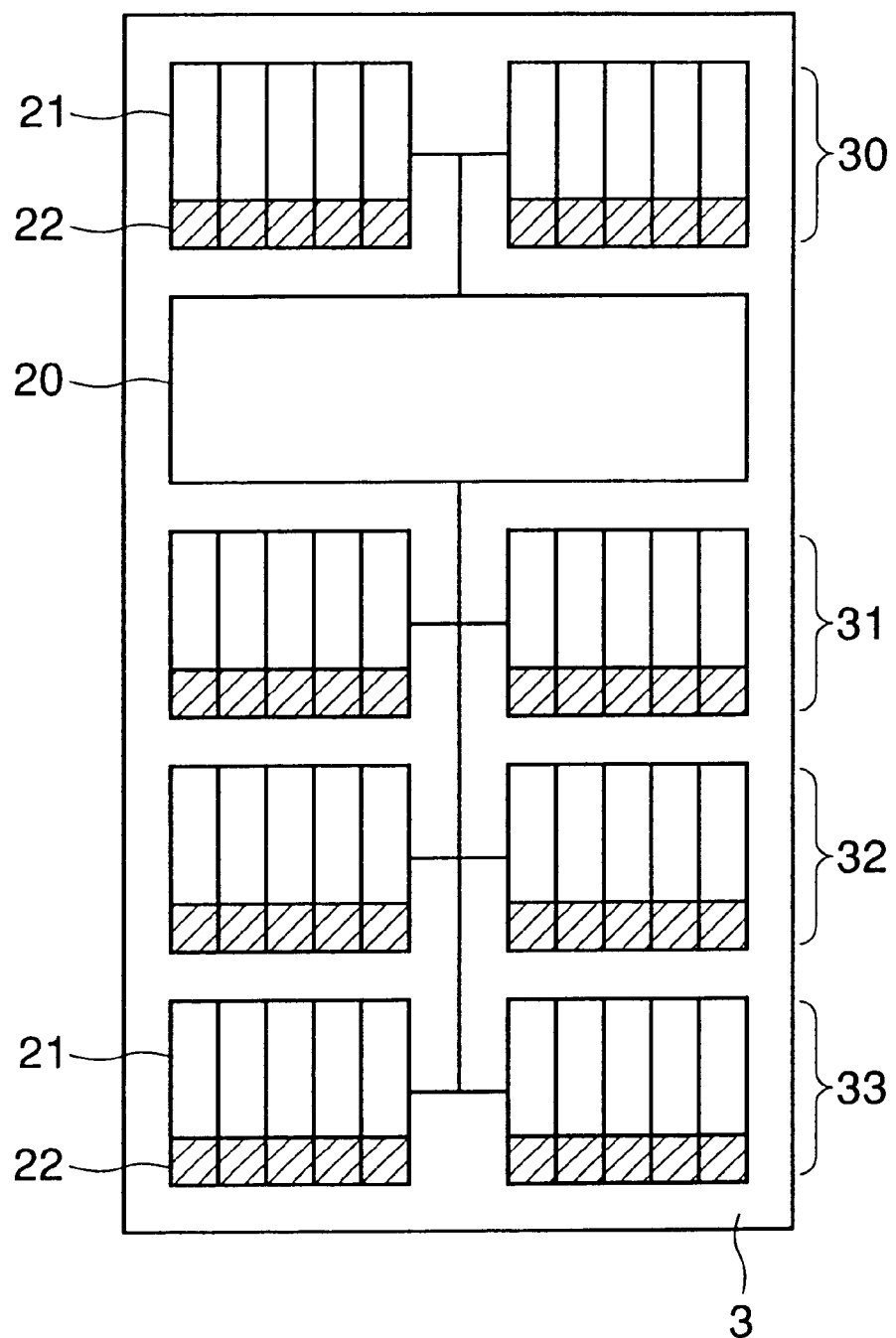
FIG. 3 is a front view of the distance sensor employed in the distance detector used in the image taking apparatus of the first embodiment.

FIG. 3 shows the structure of the distance sensor 3. For easy comparison with the distance measurement areas L1 to L4 shown in FIG. 2, the distance sensor 3 is here illustrated upside down with respect to its actual arrangement. The distance sensor 3 is provided with four pairs of line sensors 30 to 33 that cover the distance measurement areas L1 to L4, respectively. Each of these line sensors 30 to 33 has light-sensor arrays 22, which are composed of a plurality of light-sensor elements (pixels) for sensing the subject image, and processor arrays 21, which feed out the photoelectric charges generated by those light-sensor arrays 22. The light-sensor elements are realized, for example, by the use of photodiodes.

The distance sensor 3 has a control circuit 20 disposed in a space secured between the pairs of line sensors 30 and 31. The three pairs of line sensors 31 to 33 are arranged with their light-sensor arrays 22 and processor arrays 21 oriented identically, and thus with the light-sensor arrays 22 spaced evenly. However, if all the four line sensors 30 to 33 are considered together, their light-sensor arrays 22 are arranged not evenly but at partially different intervals. The control circuit 20 generates a clock for data transfer and supplies it to the line sensors 30 to 33. Disposing the control circuit 20 in a space secured between the pairs of line sensors 30 and 31 contributes to efficient use of the available space. This helps minimize the size of the distance sensor 3.

Figure 4:
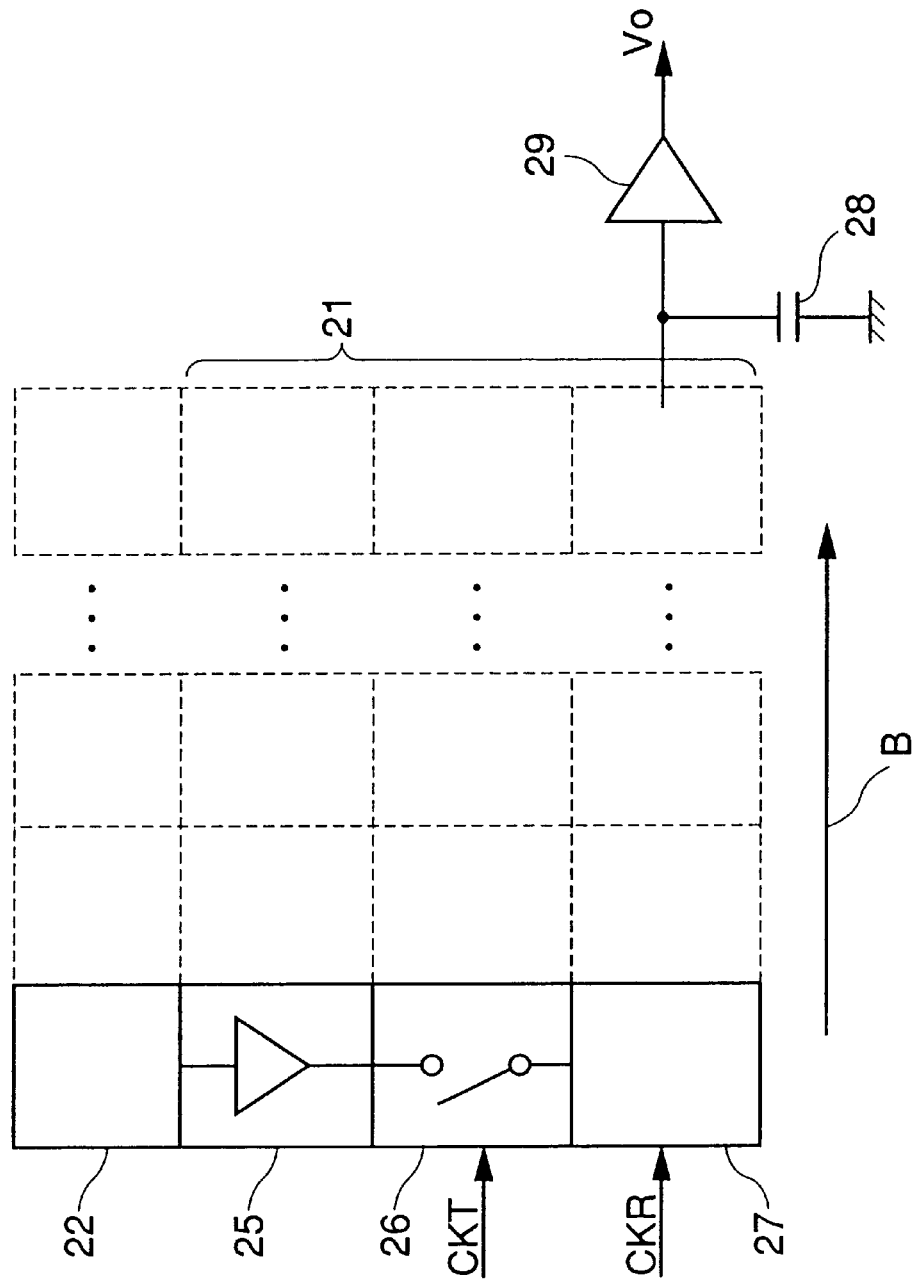
FIG. 4 is a detail view of the light-sensor arrays and processor arrays of the distance sensor employed in the first embodiment.

The relationship between a processor array 21 and a light-sensor array 22 is shown in FIG. 4. The processor array 21 is an array of processor elements, each of which is composed of an amplifier 25, a switch 26, and a shift register 27. The light-sensor array 22 is an array of light-sensor elements, each of which generates a photoelectric charge by receiving light and store it for a particular pixel. The switch 26 is turned on and off by a clock CKT that is transmitted from the control circuit 20 (see FIG. 3). In synchronism with this clock CKT, the above-mentioned photoelectric charge is transmitted from the light-sensor array 22 by way of the amplifier 25 and the switch 26 to the shift register 27.

The shift register 27 is supplied with a clock CKR for data transfer that is generated by the control circuit 20 (see FIG. 3). Typically, this clock CKR is a two- or three-phase clock. In synchronism with this clock CKR, the signals of the photoelectric charge of one pixel after another are succes- sively transferred in the direction indicated by arrow B, and are thereafter converted into a signal voltage Vo by a stray diffusion capacitance 28 and an amplifier 29 disposed in the output stage so as to be outputted from the distance sensor 3 (see FIG. 3).

In FIG. 1, the microcomputer 4 calculates the distance to the subject in accordance with the signals transmitted from the distance sensor 3 by performing calculation based on the principle of the trigonometry. This calculation will be briefly described below.

First, the microcomputer 4 selects, out of the signals obtained from the plurality of lines, the signal obtained from the line that is currently sensing the subject. Then, the microcomputer 4 calculates the distance between the subject image formed on the left-hand parts of the line sensors of the distance sensor 3 and the subject image formed on the right-hand parts of the line sensors thereof. Every individual distance detector has the relationship between the actual subject distance and the image-to-image distance previously measured and stored in its microcomputer 4. In distance measurement, the microcomputer 4 calculates the distance to the subject by referring to the stored relationship.

For example, in a case where the stored relationship predicts that the image-to-image distance is x when the distance to the subject is 1 m and that the image-to-image distance is y when the distance to the subject is 2 m, the microcomputer 4 judges that the distance to the subject is approximately 1.5 m when the image-to-image distance, as calculated from the signals transmitted from the distance sensor 3, takes a middle value between x and y. When the subject is sensed by more than one line, it is also possible to calculate the distance to the subject along each line and process the obtained results statistically to obtain higher detection accuracy.

Second Embodiment

Figure 5:
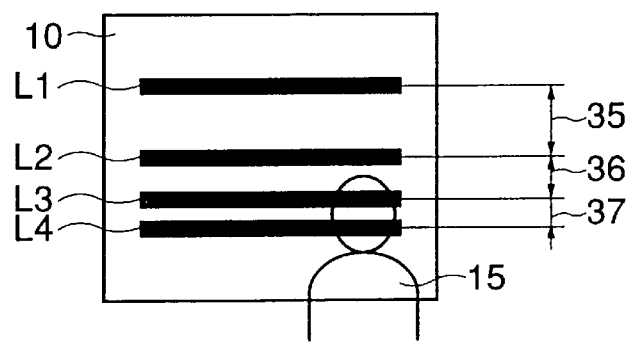
FIG. 5 is a diagram showing the relationship between the image screen and the distance measurement areas of the image taking apparatus of a second embodiment of the present invention.

Next, the distance detector of a second embodiment of the present invention will be described. The distance detector of this embodiment has a configuration similar to that of the above-described first embodiment (FIG. 1). As shown in FIG. 5, distance measurement is performed in distance measurement areas L1 to L4 secured along four lines. These measurement areas L1 to L4 are disposed at decreasing intervals 35, 36, and 37 from the top to the bottom of the image screen 10.

Figure 6:
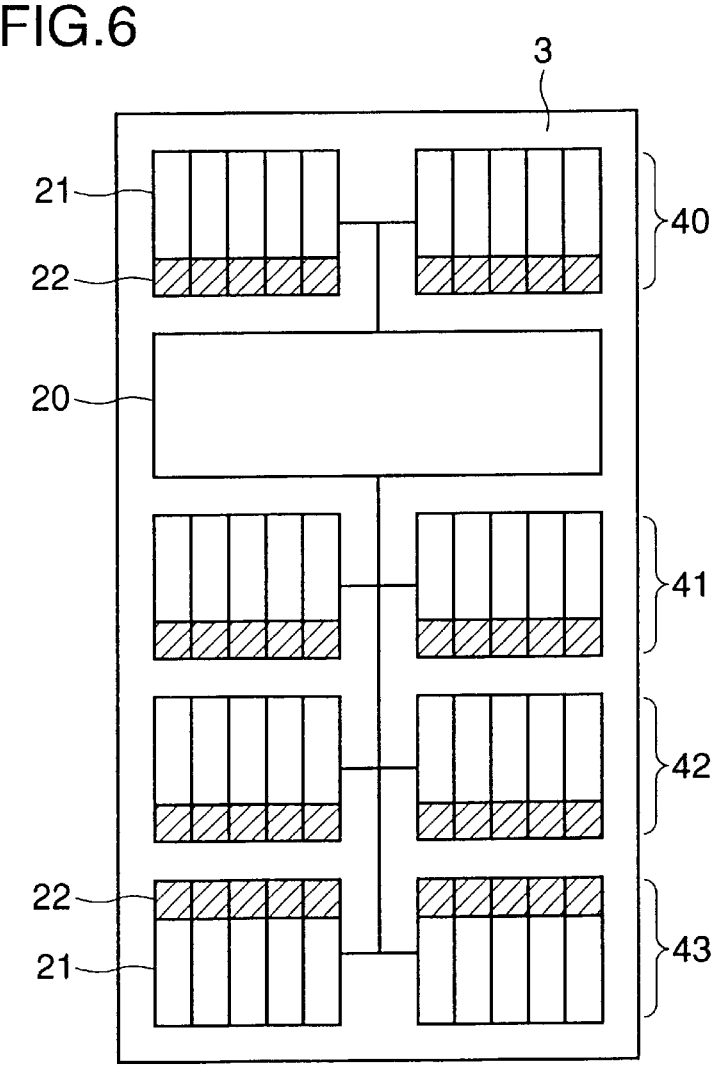
FIG. 6 is a front view of the distance sensor employed in the distance detector used in the image taking apparatus of the second embodiment.

FIG. 6 shows the structure of the distance sensor 3 of the second embodiment. In this figure, just as in the previous embodiment, the distance sensor is illustrated upside down with respect to its actual arrangement. The distance sensor is provided with four pairs of line sensors 40 to 43 that cover the distance measurement areas L1 to L4, respectively. Each of these line sensors 40 to 43 has light-sensor arrays 22, which are composed of a plurality of light-sensor elements (pixels) for sensing the subject image, and processor arrays 21, which feed out the photoelectric charges generated by those light-sensor arrays 22.

The distance sensor 3 has a control circuit 20 for gener- ating a clock disposed in a space secured between the pairs of line sensors 40 and 41. The two pairs of line sensors 41 and 42 are arranged with their light-sensor arrays 22 and processor arrays 21 oriented identically. However, the pair of line sensors 43, which covers the lowermost distance measurement area L4, is so arranged that its light-sensor arrays 22 face the light-sensor arrays 22 of the pair of line sensors 42. Accordingly, as shown in FIG. 5, the distance measurement areas L3 and L4 are arranged with the shortest interval secured therebetween.

As described above, according to this embodiment, it is possible to obtain an even higher density of distance measurement areas than in the first embodiment in the lower portion of the image screen 10 that is more important from the viewpoint of subject detection. This makes it possible to detect the subject 15 more securely in the lower portion of the image screen 10 and thus with higher distance measurement accuracy.

Third Embodiment

Figure 7A:
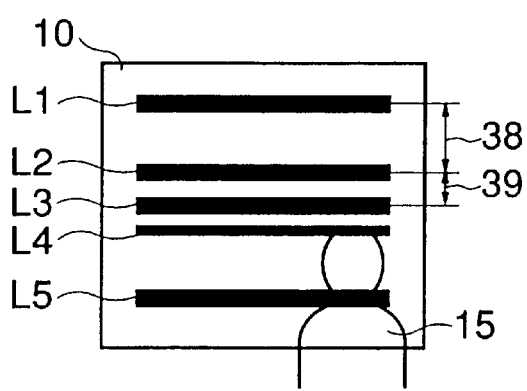
FIGS. 7A and 7B are diagrams showing the relationship between the image screen and the distance measurement areas of the image taking apparatus of a third embodiment of the present invention.

Next, the distance detector of a third embodiment of the present invention will be described. The distance detector of this embodiment has a configuration similar to that of the above-described first embodiment (FIG. 1). As shown in FIG. 7A, the distance detector has distance measurement areas L1 to L5 secured along five lines. These distance measurement areas L1 to L5 are arranged symmetrically with respect to the axis through the central one L3.

The distance measurement areas L1 to L3 are disposed at decreasing intervals 38 and 39 from the top to the center of the image screen 10. That is, the closer to the center of the image screen 10, the shorter the interval at which the distance measurement areas are arranged. This arrangement is advantageous in cases where the subject 15 is likely to be located in a central portion of the image screen 10. On the other hand, the density of distance measurement areas is comparatively low in an upper and a lower portion of the image screen 10.

Figure 7B:
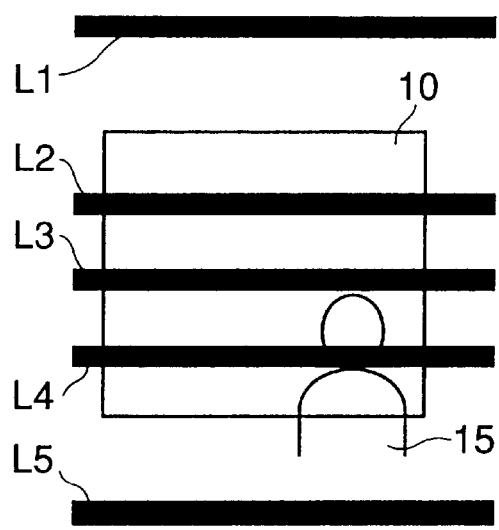

In a camera provided with a variable-magnification optical system that can vary the shooting magnification, as the shooting magnification is increased, the arrangement of the distance measurement areas L1 to L5 changes from a state as shown in FIG. 7A to a state as shown in FIG. 7B. As a result, whereas the measurement areas L1 and L5 go out of the image screen 10, the measurement areas L2 to L4, which are disposed at shorter intervals, remain within the image screen 10. This helps prevent degradation of distance measurement accuracy.

Figure 8:
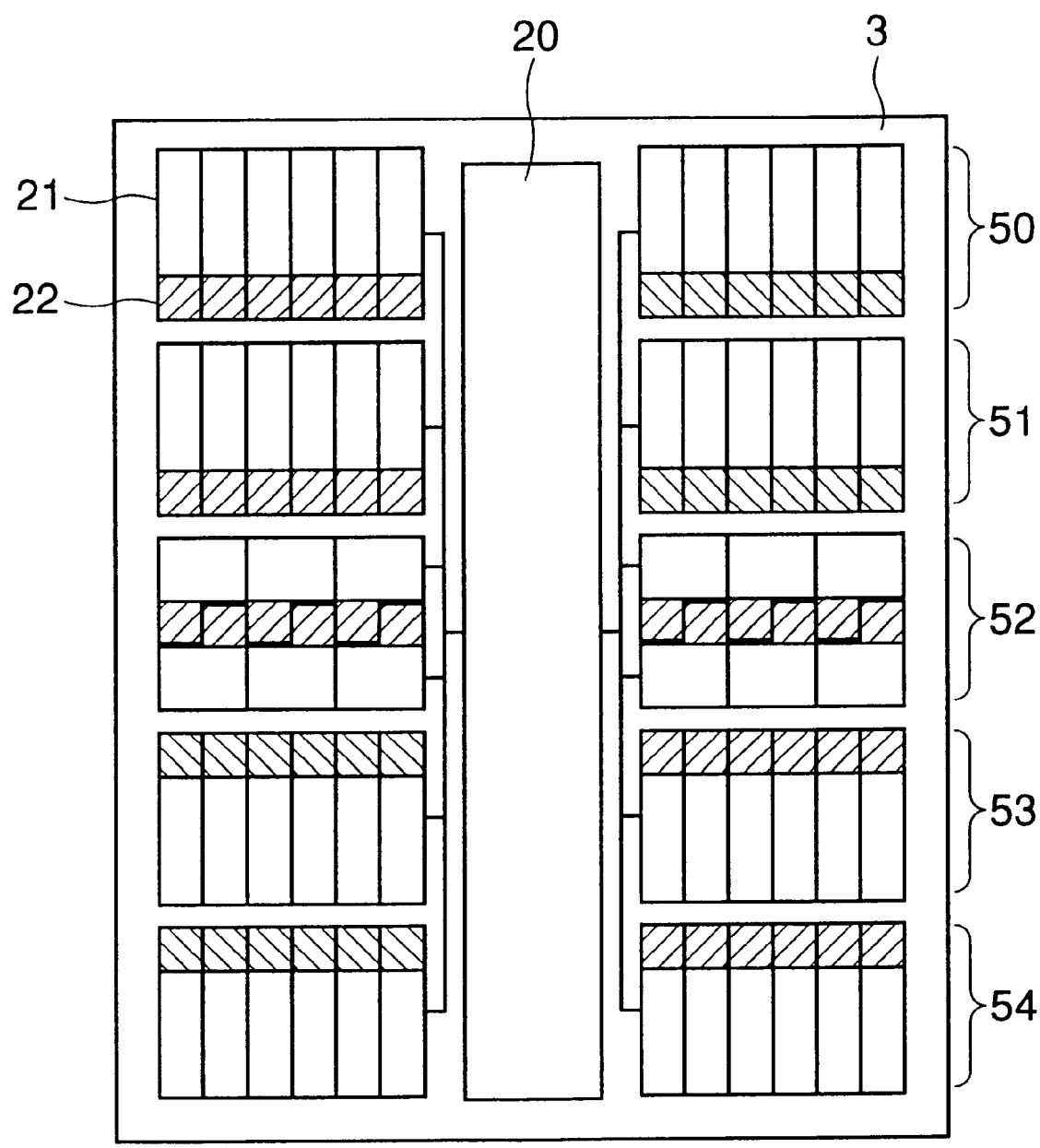
FIG. 8 is a front view of the distance sensor employed in the distance detector used in the image taking apparatus of the third embodiment.

FIG. 8 shows the structure of the distance sensor 3 of the third embodiment. The distance sensor is provided with five pairs of line sensors 50 to 54 that cover the distance measurement areas L1 to L5, respectively (see FIG. 7A). Each of these pairs of line sensors 50 to 54 has light-sensor arrays 22, which are composed of a plurality of light-sensor elements (pixels) for sensing the subject image, and processor arrays 21, which feed out the photoelectric charges generated by those light-sensor arrays 22.

In the central pair of line sensor 52, the light-sensor array 22 and the processor array 21 are formed of a plurality of L-shaped blocks combined together, each composed of a light-sensor element and a processor element.

The other four pairs of line sensors 50, 51, 53, and 54 are arranged with their light-sensor arrays 22 placed closer to the center of the distance sensor than their processor arrays 21. As a result, the light-sensor arrays 22 are arranged at shorter intervals near the center of the distance sensor 3, (as with those of the line sensors 51 to 53) than near the top or bottom end thereof (as with those of the line sensors 50 and 51 or 53 and 54).

As described above, according to the distance detector of this embodiment, the distance measurement areas are more widely spaced in the upper and lower portions of the image screen 10 than in the central portion thereof. This makes it possible to achieve distance measurement with fewer distance measurement areas but without sacrificing the distance measurement accuracy in relatively important portions of the image screen. Consequently, the amount of data to be processed by the microcomputer 4 (see FIG. 1) is reduced, and thus the subject distance can be calculated in a shorter time. This prevents an undesirable delay in automatic focusing, and thereby frees the user from possibly uncomfortable operation. Note that, in the state as shown in FIG. 7B, i.e. when a high magnification is selected in a camera provided with a variable-magnification optical system, it is not necessary to perform distance measurement in the distance measurement areas L1 and L5.

Fourth Embodiment

Figure 9A:
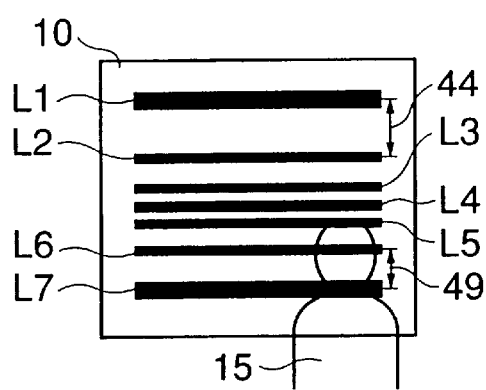
FIGS. 9A and 9B are diagrams showing the relationship between the image screen and the distance measurement areas of the image taking apparatus of a fourth embodiment of the present invention.

Next, the distance detector of a fourth embodiment of the present invention will be described. The distance detector of this embodiment has a configuration similar to that of the above-described first embodiment (FIG. 1). As shown in FIG. 9A, the distance detector is provided with measurement areas L1 to L7 secured along seven lines. These measurement areas L1 to L7 are disposed at decreasing intervals from the uppermost and lowermost ones L1 to L7 to the central one L4. The use of as many as seven measurement areas L1 to L7 contributes to secure detection of the subject 15 and to higher distance measurement accuracy. In addition, the measurement areas L1 to L7 are arranged at shorter intervals near the center of the image screen 10, and therefore the subject 15 can be detected securely around the center of the image screen 10.

Figure 9B:
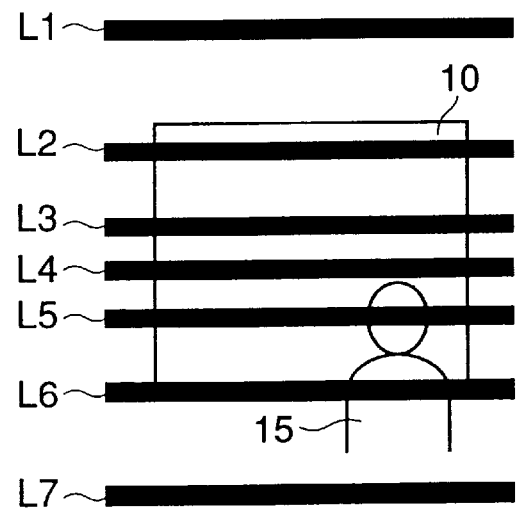

In a camera provided with a variable-magnification optical system, as the shooting magnification is increased, the arrangement of the distance measurement areas L1 to L7 changes from a state as shown in FIG. 9A to a state as shown in FIG. 9B. As a result, whereas the measurement areas L1 and L7 go out of the image screen 10, the measurement areas L2 to L6 remain within the image screen 10. This helps achieve effective distance measurement.

In the distance detector of the fourth embodiment, as shown in FIG. 9A, the interval 49 between the two distance measurement areas L6 and L7 located at the lower end of the image screen 10 is made shorter than the interval 44 between the two distance measurement areas L1 and L2 located at the upper end of the image screen 10. This is because the lower portion of the image screen 10 is more important for the detection of the subject 15.

Figure 10:
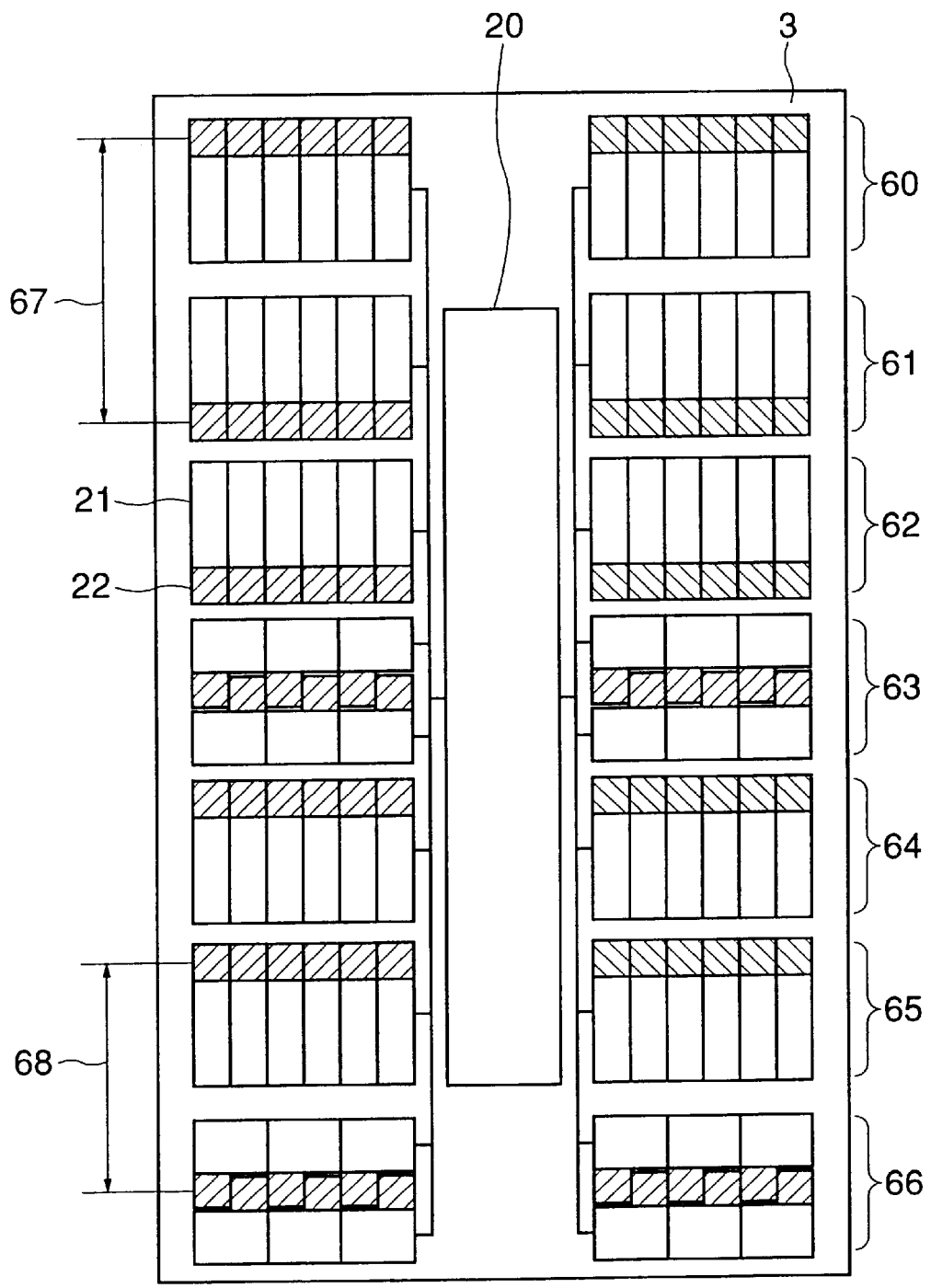
FIG. 10 is a front view of the distance sensor employed in the distance detector used in the image taking apparatus of the fourth embodiment.

FIG. 10 shows the structure of the distance sensor 3 employed in the distance detector of the fourth embodiment. The distance sensor 3 is provided with seven pairs of line sensors 60 to 66 that cover the distance measurement areas L1 to L7, respectively (see FIG. 9A). The distance sensor 3 also has, along the line along which the line sensors 60 to 66 are divided into their left-hand and right-hand parts, a control circuit 20, which generates a clock for signal transfer.

In the pairs of line sensors 63 and 66, which cover the distance measurement areas L4 and L7, respectively (see FIG. 9A), the light-sensor array and the processor array are formed of a plurality of L-shaped blocks combined together, each composed of a light-sensor element and a processor element. The pairs of line sensors 61, 62, 64, and 65 are arranged with their light-sensor arrays 22 placed closer to the pairs of line sensor 63 than their processor arrays 21.

The two pairs of line sensors 60 and 61 are so arranged that their processor arrays 21 face each other. Thus, the light-sensor arrays 22 of these line sensors 60 and 61 are disposed with a long interval 67 between them. Even then, placing their processor arrays 21 in the thus secured interval 67 helps minimize the size of the distance sensor 3.

On the other hand, the interval 68 between the pairs of line sensors 65 and 66 is shorter than the above-mentioned distance 67 because of the configuration of the pair of line sensor 66 as described above. This corresponds to the fact that, in FIG. 9A, the interval 44 between the distance measurement areas L1 and L2 is longer than the interval 49 between the distance measurement areas L6 and L7.

Fifth Embodiment

Figure 11:
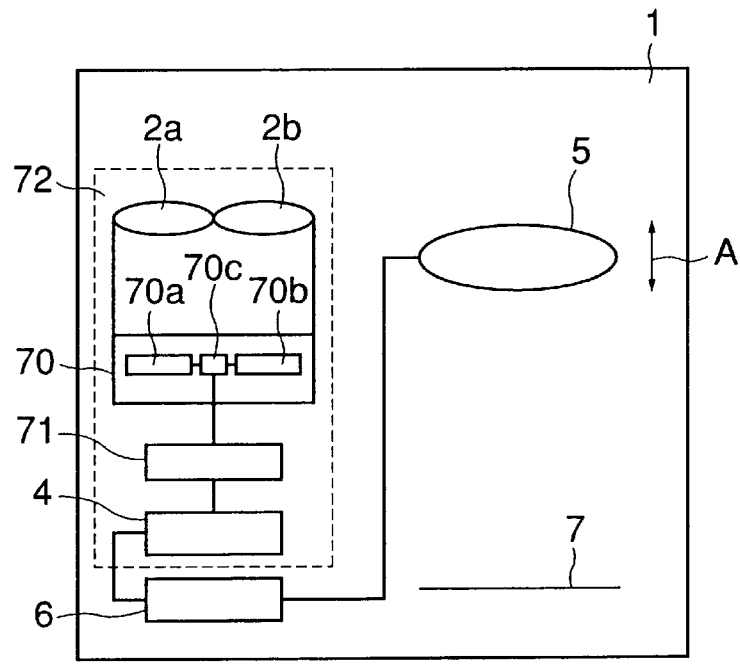
FIG. 11 is a block diagram of the image taking apparatus of a fifth embodiment of the present invention.

Next, the distance detector of a fifth embodiment of the present invention will be described. FIG. 11 is a block diagram of an image taking apparatus 1, such as a silver halide film camera, provided with a distance detector 72 according to this embodiment. The image taking apparatus 1 forms an image of a subject on an image forming means 7, such as a silver halide film, by means of an image taking optical system 5. The distance detector 72 detects the distance to the subject by the use of distance sensor 70.

As will be described later, from the data obtained from the distance sensor 70, the data related to selected ones among distance measurement areas is extracted by means of an extracting means 71. The extracted data is transmitted to a microcomputer 4, which then performs distance measurement within those selected distance measurement areas. The distance detector 72 then performs automatic focusing by moving the image taking optical system 5 as indicated by arrow A by the use of a driving means 6 composed of a motor and other components in accordance with the detected subject distance.

The distance detector 72 is provided with, a pair of distance measurement optical systems 2a and 2b arranged parallel to each other, a distance sensor 70 disposed substantially over the entire imaging plane of the optical systems 2a and 2b, and a microcomputer 4 which serves as a means for performing calculation to obtain the distance to the subject in accordance with the signals transmitted from the distance sensor 70. The distance sensor 70 is composed of area sensors 70a and 70b arranged symmetrically, and a control circuit 70c for generating a clock.

Figure 12A:
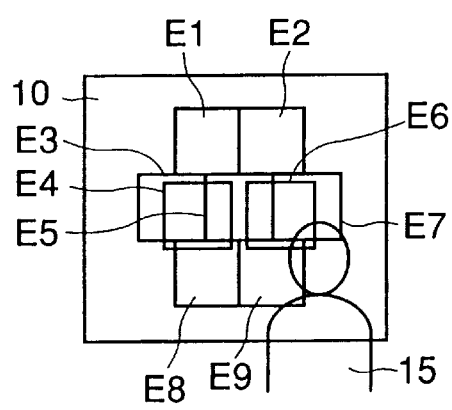
FIGS. 12A and 12B are diagrams showing the relationship between the image screen and the distance measurement areas of the image taking apparatus of the fifth embodiment.

As shown in FIG. 12A, in the distance detector of this embodiment, an extracting means 71 assigns nine distance measurement areas E1 to E9 to cover the entire image screen 10. Detection of the subject 15 is performed in each of these distance measurement areas E1 to E9, and, when the subject 15 is detected in any, calculation is performed to obtain the distance to the subject 15. In this embodiment, the distance measurement areas E1 to E9 are all identical in size and shape.

Conventionally, as shown in FIG. 21A, the distance measurement areas E1 to E9 are arranged evenly over the entire image screen so as not to overlap each other. In contrast, in this embodiment, as shown in FIG. 12A, the distance measurement areas E1 to E9 are arranged with some overlap each other among them. Moreover, the density of distance measurement areas is higher near the center of the image screen 10, where five of them E3 to E7 are located, than near the upper and lower ends thereof. There are overlaps between the measurement areas E3 to E9.

Accordingly, in a case where the subject 15 is likely to be located in a central portion of the image screen 10, the comparatively high density of distance measurement areas in that portion helps detect the subject 15 securely. By contrast, the comparatively low density of distance measurement areas in an upper or lower portion of the image screen 10 helps reduce the amount of data to be processed by the microcomputer 4 (see FIG. 11).

Figure 12B:
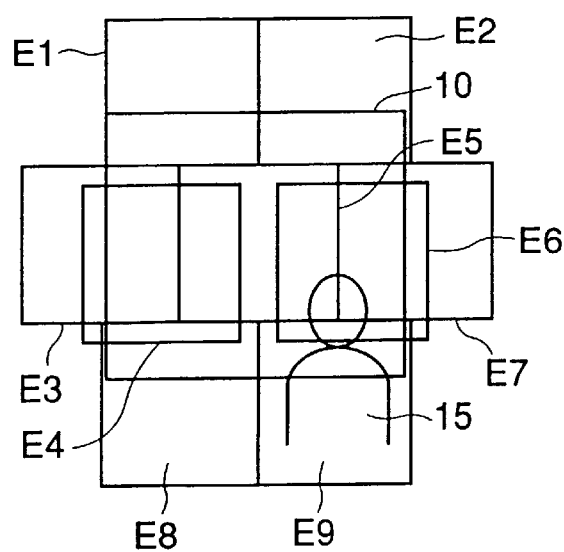

In a camera provided with a variable-magnification optical system that can vary the shooting magnification, as the shooting magnification is increased, the arrangement of the distance measurement areas E1 to E9 over the image screen 10 changes from a state as shown in FIG. 12A to a state as shown in FIG. 12B. As a result, most of the measurement areas E1 to E3 and E7 to E9 goes out of the image screen 10. This reduces the significance of distance measurement there. However, by the use of the three measurement areas E4 to E6 remaining within the image screen 10, it is still possible to perform distance measurement effectively.

Conventionally, as shown in FIG. 21B, only one measurement area E5 remains valid at a high shooting magnification. By contrast, in this embodiment, as many as three distance measurement areas E4 to E6 remain valid in the same situation. This makes it possible to detect the subject 15 securely and in addition with higher distance measurement accuracy.

Figure 13:
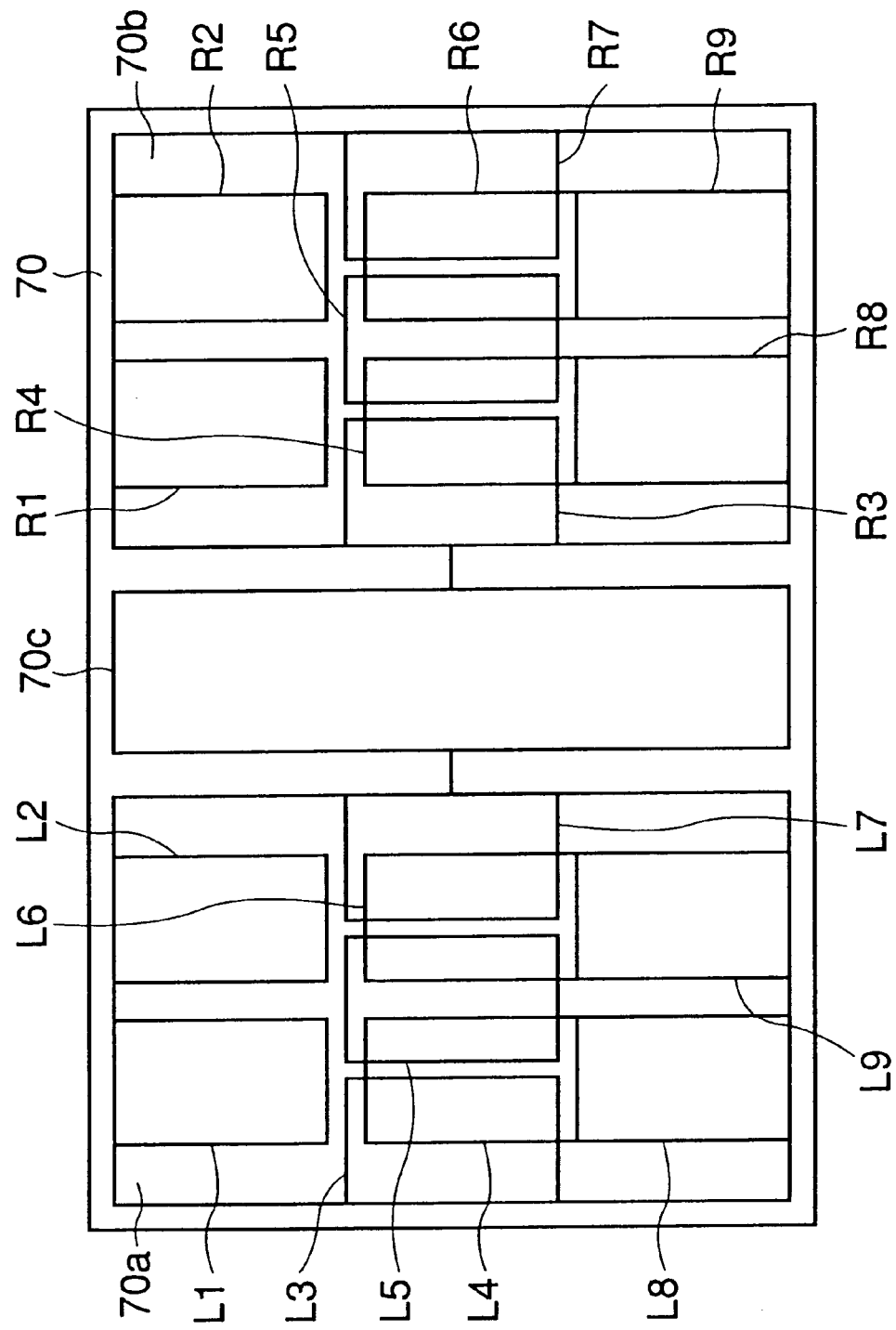
FIG. 13 is a front view of the distance sensor employed in the distance detector used in the image taking apparatus of the fifth embodiment.

The distance sensor 70 is realized, for example, by the use of a CCD (Charge Coupled Device) image sensor. As shown in FIG. 13, this distance sensor 70 has a control circuit 70c for generating a clock for data transfer, and a pair of area sensors 70a and 70b disposed on the left and right sides, respectively, of the control circuit 70c. The area sensors 70a and 70b have sensing areas each composed of a plurality of light-sensor elements (pixels), such as realized by the use of photodiodes, that are arranged in a two-dimensional array.

The area sensors 70a and 70b are provided with subject-detecting areas L1 to L9 and R1 to R9, respectively, that cover the distance measurement areas E1 to E9 (see FIG. 12A). The subject-detecting areas L1 to L9 and R1 to R9 are each formed as, for example, an array of dozens of rows by dozens of columns of pixels. In synchronism with a data transfer clock generated by the control circuit 70c, the data from all over the area sensors 70a and 70b is successively fed out of the distance sensor 70. From this data, the extracting means 71 extracts the data related to the subject-detecting areas L1 to L9 and R1 to R9 and feeds it to the microcomputer 4.

Then, in accordance with the data related to the subject-detecting areas as extracted by the extracting means 71, the microcomputer 4 checks whether there is any subject image detected and, if there is any, it calculates the distance to it by performing calculation based on the principles of trigonometry just as in the first embodiment. That is, as described above, the relationship between the actual subject distance and the image-to-image distance as observed on the distance sensor 70 is previously measured and stored in the microcomputer 4. In distance measurement, the microcomputer 4 calculates the distance to the subject by referring to this stored relationship. Moreover, since the distance measurement areas E1 to E9 are functionally independent of one another, the microcomputer 4 can also detect the direction in which the subject 15 is located by checking which distance measurement area is sensing the subject.

As described above, according to this embodiment, the distance detector has its subject-detecting areas unevenly distributed with respect to its area sensors. This makes it possible to perform distance measurement with more weight given to those portions of the image screen which are important from the viewpoint of distance measurement, and thereby reduce the amount of the data to be processed for less important portions. This allows the microcomputer 4 (see FIG. 11) to calculate the subject distance in a shorter time. Note that the area sensors 70a and 70b may or may not have light-sensor elements in their portions other than the subject-detecting areas L1 to L9 and R1 to R9.

Sixth Embodiment

Next, the distance detector of a sixth embodiment of the present invention will be described. The distance detector of this embodiment has a configuration similar to that of the above-described fifth embodiment (FIG. 11). Its distance sensor 70 is realized by the use of an image sensor as shown in FIG. 13. However, in this embodiment, the extracting means 71 assigns the distance measurement areas in a different manner from in the fifth embodiment.

Figure 14A:
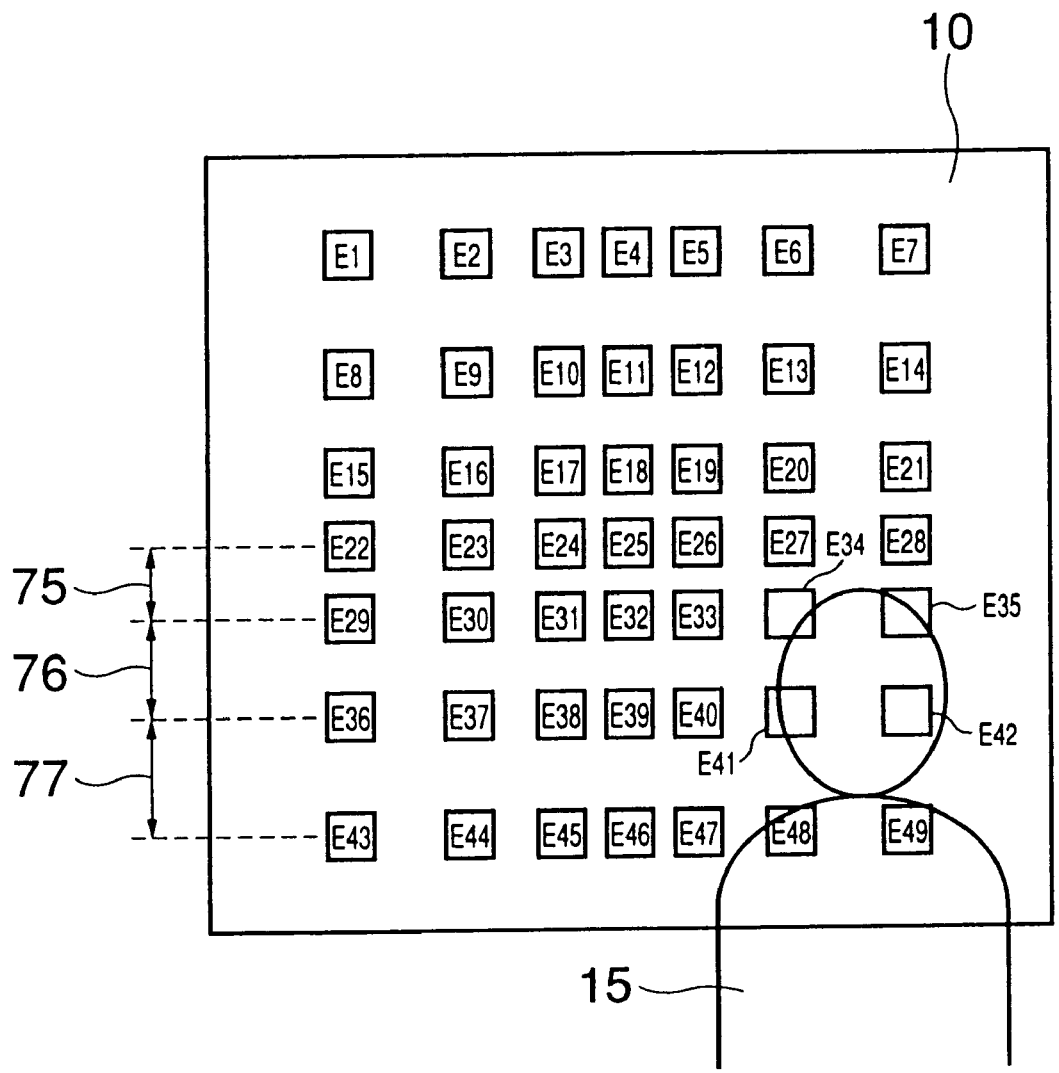
FIGS. 14A and 14B are diagrams showing the relationship between the image screen and the distance measurement areas of the image taking apparatus of a sixth embodiment of the present invention.

As shown in FIG. 14A, the distance detector has 49 distance measurement areas E1 to E49 distributed over the entire image screen. In distance measurement, the microcomputer 4 checks the presence of the subject image 15 in each of these distance measurement areas E1 to E49 and, when the subject image 15 is found present, it calculates the distance to the subject 15 by performing calculation in the same manner as described above.

As shown in FIG. 14A, the distance measurement areas are arranged at increasing intervals 75, 76, and 77 from the center to each side, i.e. both horizontally and vertical, of the image screen 10 so that the density of distance measurement areas is high near the center of the image screen 10 than elsewhere. This eliminates the need for the microcomputer 4 to process the data from all of the sensing areas of the area sensors 70a and 70b (see FIG. 13) to calculate the distance to the subject, and thus helps reduce calculation time.

Figure 14B:
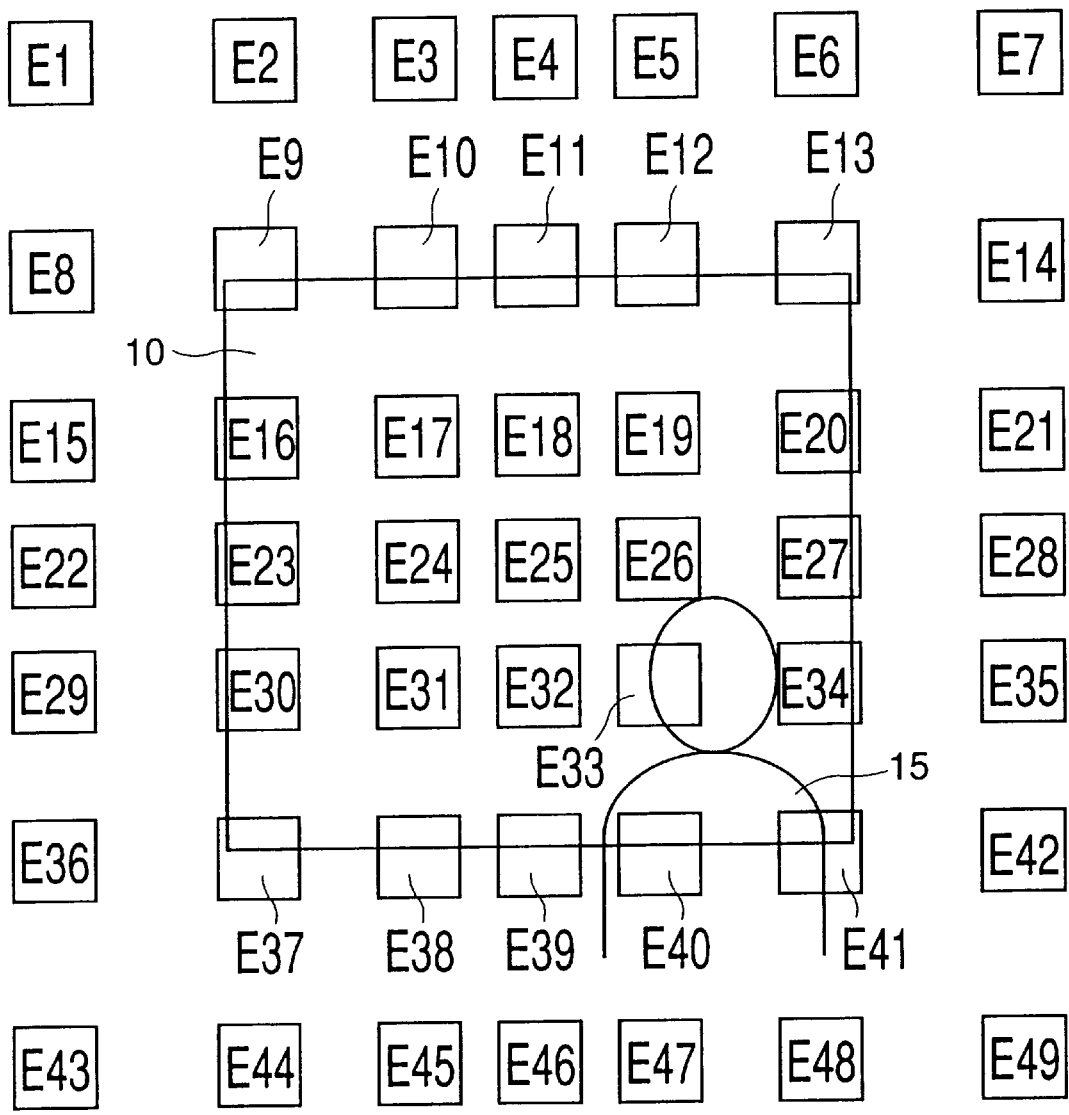

In a camera provided with a variable-magnification optical system that can vary the shooting magnification, as the shooting magnification is increased, the arrangement of the distance measurement areas E1 to E49 changes from a state as shown in FIG. 14A to a state as shown in FIG. 14B. As a result, the measurement areas other than E16 to E20, E23 to E27, and E30 to E34 go out of the image screen 10. This reduces the significance of subject detection. However, the measurement areas are more densely disposed around the center of the image screen 10 than elsewhere, and therefore distance measurement can be performed without undue loss in distance measurement accuracy. Moreover, there is no need to perform distance measurement calculation for those distance measurement areas that are located out of the image screen 10, and this helps reduce calculation time.

Seventh Embodiment

Next, the distance detector of a seventh embodiment of the present invention will be described. The distance detector of this embodiment has a configuration similar to that of the above-described fifth embodiment (FIG. 11). Its distance sensor 70 is realized by the use of an image sensor as shown in FIG. 13. However, in this embodiment, the extracting means 71 assigns the distance measurement areas in a different manner from in the fifth embodiment.

Figure 15:
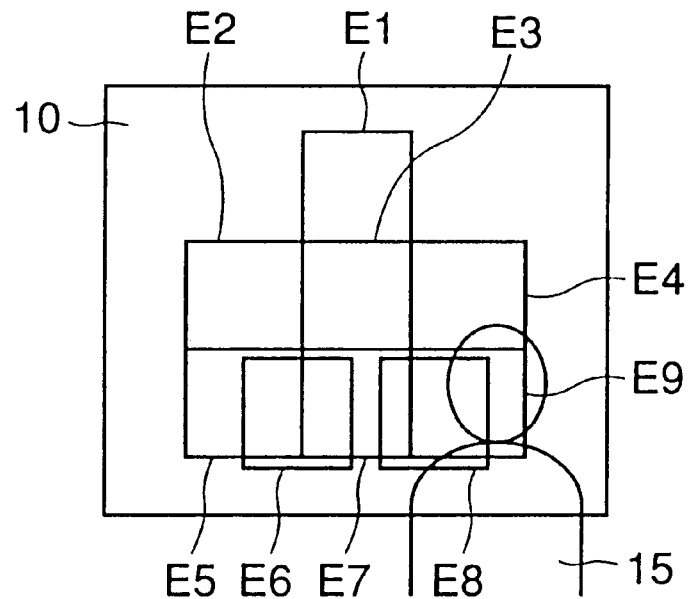
FIG. 15 is a diagram showing the relationship between the image screen and the distance measurement areas of the image taking apparatus of a seventh embodiment of the present invention.

As shown in FIG. 15, the distance detector has nine distance measurement areas E1 to E9 distributed over the entire image screen. In distance measurement, the microcomputer 4 checks the presence of the subject image 15 in each of these distance measurement areas E1 to E9 and, when the subject image is found present, it calculates the distance to the subject by performing calculation in the same manner as described above.

As shown in FIG. 15, the distance measurement areas E1 to E9 are so arranged that their density increases toward the lower end of the image screen 10. This makes it possible to perform distance measurement with more weight given to the lower portion of the image screen 10, and thereby cope with cases where the subject 15 is likely to be located in the lower portion of the image screen 10. On the other hand, since the subject 15 is less likely to be located in the upper portion of the image screen 10, the comparatively low density of distance measurement areas in the upper portion of the image screen 10 allows the microcomputer 4 (see FIG. 11) to perform calculation in a shorter time.

Eighth Embodiment

Next, the distance detector of an eighth embodiment of the present invention will be described. The distance detector of this embodiment has a configuration similar to that of the above-described fifth embodiment (FIG. 11). Its distance sensor 70 is realized by the use of an image sensor as shown in FIG. 13. However, in this embodiment, the extracting means 71 assigns the distance measurement areas in a different manner from in the fifth embodiment.

Figure 16:
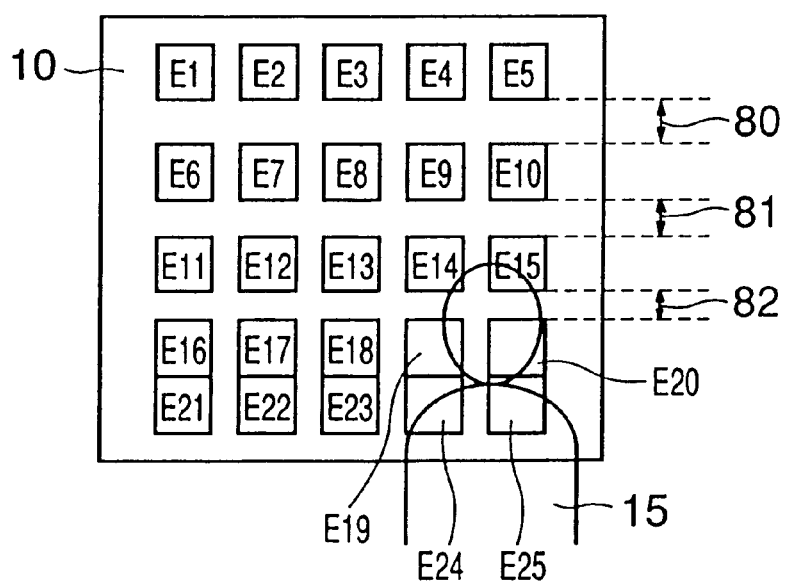
FIG. 16 is a diagram showing the relationship between the image screen and the distance measurement areas of the image taking apparatus of an eighth embodiment of the present invention.
Figure 17:
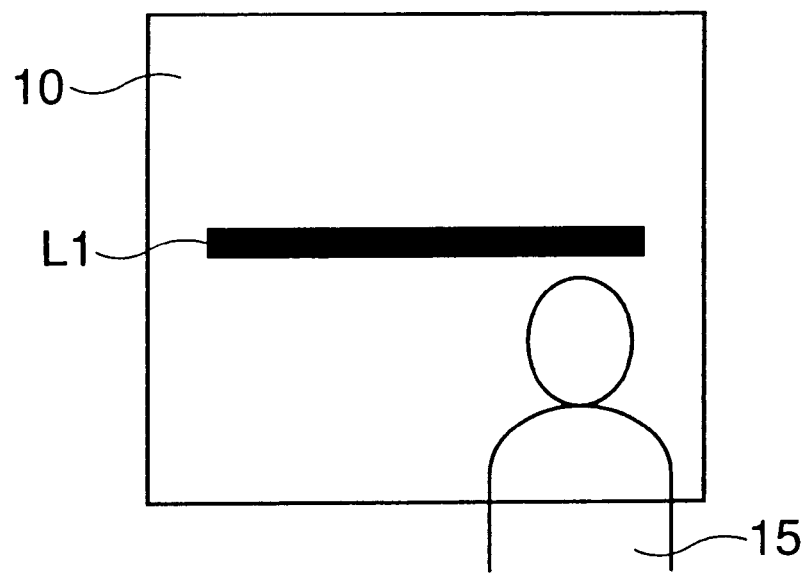
FIG. 17 is a diagram showing an example of the relationship between the image screen and the distance measurement area of a conventional image taking apparatus.
Figure 18:
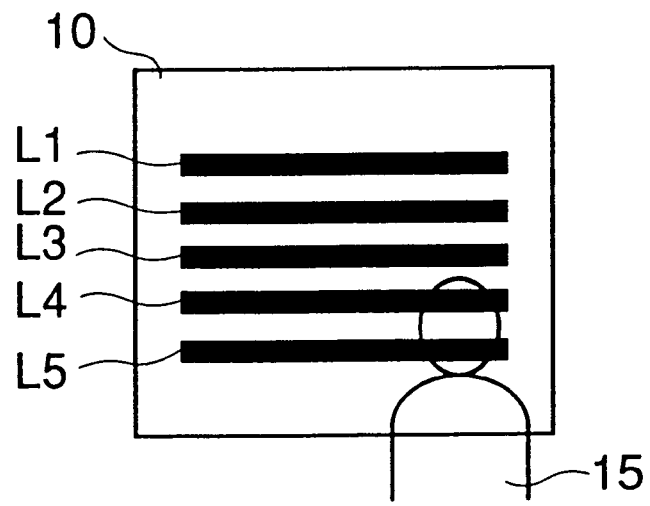
FIG. 18 is a diagram showing another example of the relationship between the image screen and the distance measurement areas of a conventional image taking apparatus.
Figure 19:
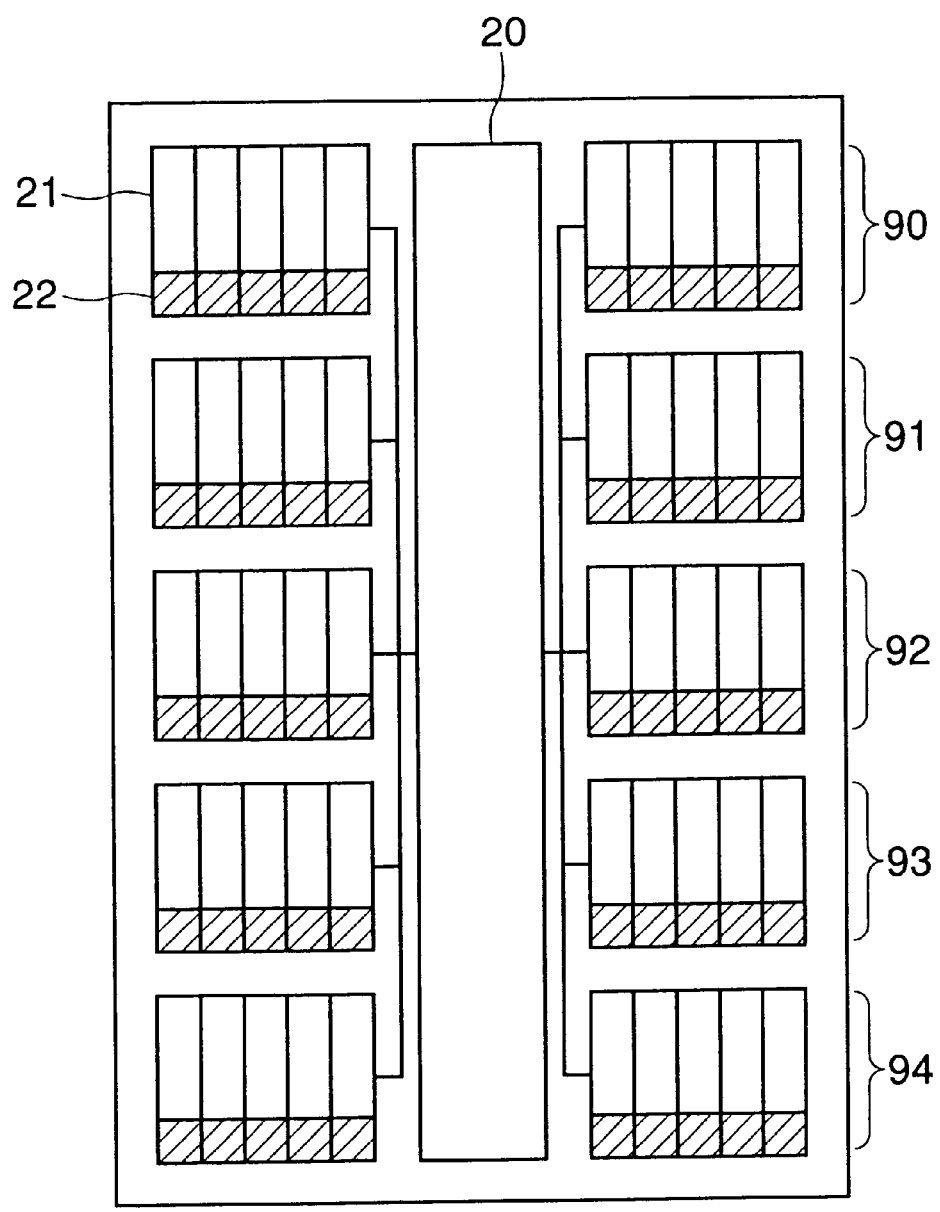
FIG. 19 is a front view of the distance sensor employed in the distance detector of a conventional image taking apparatus.
Figure 20A:
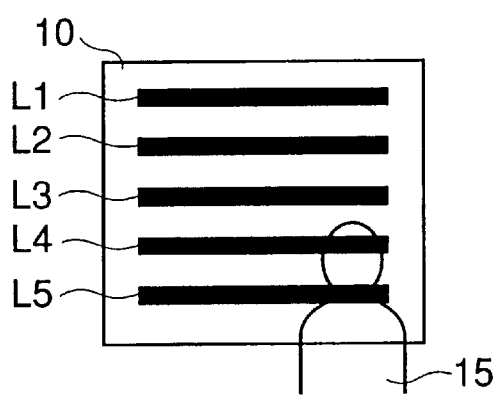
FIGS. 20A and 20B are diagrams showing the relationship between the image screen and the distance measurement areas of the image taking apparatus of a conventional camera provided with a variable-magnification optical system.
Figure 20B:
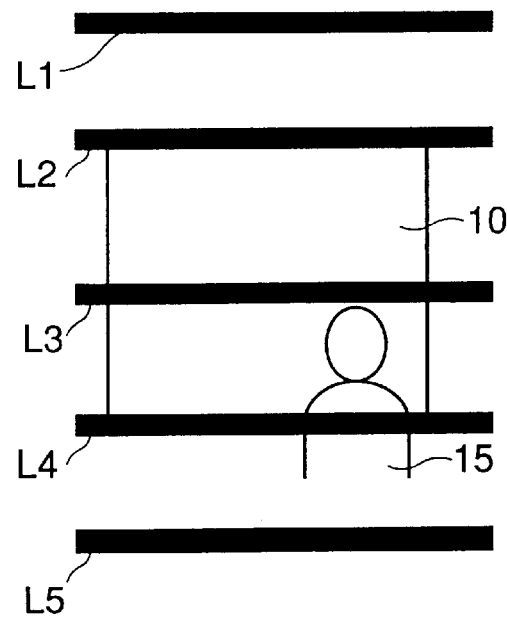

As shown in FIG. 16, the distance detector has 25 distance measurement areas E1 to E25 distributed over the entire image screen. In distance measurement, the microcomputer 4 checks the presence of the subject image 15 in each of these distance measurement areas E1 to E25 and, when the subject image is found present, it calculates the distance to the subject by performing a calculation in the same manner as described above.

As shown in FIG. 16, the distance measurement areas E1 to E5 in the uppermost rows are evenly spaced. The distance measurement areas E6 to E10 in the second row are arranged at a distance 80 from the uppermost row. The distance measurement areas E11 to E15 in the third row are arranged at a distance 81, which is shorter than the distance 80, from the second row. The distance measurement areas E16 to E20 in the fourth row are arranged at a distance 82, which is shorter than the distance 81, from the third row. The distance measurement areas E21 to E25 in the lowermost row are arranged immediately adjacent to E16 to E20, respectively, with no gap therebetween. Note that, within each of these rows, the distance measurement areas are spaced evenly, as in the uppermost row.

In this arrangement, it is possible to perform distance measurement with more weight given to the lower portion of the image screen 10, and thereby cope with cases where the subject 15 is likely to be located in the lower portion of the image screen 10. On the other hand, since the subject 15 is less likely to be located in the upper portion of the image screen 10, the comparatively low density of the distance measurement areas in the upper portion of the image screen 10 allows the microcomputer 4 (see FIG. 11) to calculate the distance to the subject in a shorter time.

What is claimed is:

1. A distance detector comprising:

an optical system for forming an image of a subject;

a distance sensor having at least three line sensors disposed substantially on an imaging plane of said optical system, said line sensors being arranged at partially uneven intervals that decrease gradually toward a center of said distance sensor; and a distance calculating circuit for calculating a distance to the subject in accordance with an output from said distance sensor.

2. A distance detector as claimed in claim 1, wherein each of said line sensors has a light-sensor array composed of a plurality of pixels for sensing the subject image and a processor array for processing outputs from said light-sensor array, said line sensors being arranged with their light-sensor arrays disposed at partially uneven intervals.

3. A distance detector as claimed in claim 1, wherein said distance sensor has a control circuit for controlling said line sensors, said control circuit being disposed where a space wide enough therefor can be secured between line sensors.

4. A distance detector as claimed in claim 2, wherein said line sensors include two line sensors disposed with their light-sensor arrays facing each other.

5. A distance detector as claimed in claim 2, wherein said line sensors include two line sensors disposed with their processor arrays facing each other.

6. A distance detector as claimed in claim 2, wherein said line sensors include a line sensor so configured as to have processor arrays on both sides of a light-sensor array.

7. A distance detector comprising:

an optical system for forming an image of a subject;

a distance sensor disposed substantially on an imaging plane of said optical system and having an area sensor composed of a plurality of pixels arranged in a two-dimensional array;

an extracting circuit for extracting data related to the subject image from a plurality of sensing areas provided on said area sensor, said sensing areas being distributed unevenly over said area sensor such that their density increases toward a center of said area sensor; and a distance calculating circuit for calculating a distance to the subject in accordance with said extracted data related to the subject image.

8. A distance detector as claimed in claim 7, wherein said sensing areas are arranged with overlaps among them in a portion of said area sensor where they are arranged with a higher density.

9. A photoelectric converter comprising:

a sensor having at least three line sensors, said line sensors being arranged at partially uneven intervals which decrease gradually toward a center of said sensor; and a control circuit for controlling and driving said line sensors.

10. A photoelectric converter as claimed in claim 9, wherein each of said line sensors has a light-sensor array composed of a plurality of pixels and a processor array for processing outputs from said light-sensor array, said line sensors being arranged with their light-sensor arrays disposed at partially uneven intervals.

11. A photoelectric converter as claimed in claim 9, wherein said control circuit is disposed where a space wide enough therefor can be secured between line sensors.

12. A photoelectric converter as claimed in claim 10, wherein said line sensors include two line sensors disposed with their light-sensor arrays facing each other.

13. A photoelectric converter as claimed in claim 10, wherein said line sensors include two line sensors disposed with their processor arrays facing each other.

14. A photoelectric converter as claimed in claim 10, wherein said line sensors include a line sensor so configured as to have processor arrays on both sides of a light-sensor array.

15. A photoelectric converter comprising:

an area sensor having a plurality of pixels arranged in a two-dimensional array;

a control circuit for controlling a reading operation of said area sensor; and an extracting circuit for extracting, out of data read out by said area sensor, data from a plurality of sensing areas that are distributed unevenly over said area sensor such that their density increases toward a center of said area sensor.

16. A photoelectric converter as claimed in claim 15, wherein said sensing areas are arranged with overlaps among them in a portion of said area sensor where they are arranged with a higher density.

17. A distance detector comprising:

an optical system for forming an image of a subject;

a distance sensor disposed substantially on an imaging plane of said optical system and having an area sensor composed of a plurality of pixels arranged in a two-dimensional array;

an extracting circuit for extracting data related to the subject image from a plurality of sensing areas provided on said area sensor, said sensing areas being distributed unevenly over said area sensor with overlaps among them in a portion of said area sensor where they are arranged with a higher density; and a distance calculating circuit for calculating a distance to the subject in accordance with said extracted data related to the subject image.

18. A photoelectric converter comprising:

an area sensor having a plurality of pixels arranged in a two-dimensional array;

a control circuit for controlling a reading operation of said area sensor; and an extracting circuit for extracting, out of data read out by said area sensor, data from a plurality of sensing areas that are distributed unevenly over said area sensor with overlaps among them in a portion of said area sensor where they are arranged with a higher density.

* * * * *